US012003118B2

(12) United States Patent
Biderman et al.

(10) Patent No.: US 12,003,118 B2
(45) Date of Patent: Jun. 4, 2024

(54) WIRELESS POWER SYSTEM HAVING IDENTIFIABLE RECEIVERS

(71) Applicant: Wi-Charge Ltd., Rehovot (IL)

(72) Inventors: Yoav Biderman, Tel Aviv (IL); Ortal Alpert, Ness Ziona (IL); Ori Refael Mor, Tel Aviv (IL); Omer Nahmias, Aminadav (IL); Lior Golan, Ramat Gan (IL); Ran Sagi, Tel Aviv (IL); Zohar Levin, Rehovot (IL); Alexander Slepoy, Chandler, AZ (US); Yan Rosh, Tel Aviv (IL); Eyal Conforti, Tel Aviv (IL)

(73) Assignee: Wi-Charge Ltd., Rehovot (IL)

( * ) Notice: Subject to any disclaimer, the term of this patent is extended or adjusted under 35 U.S.C. 154(b) by 0 days.

(21) Appl. No.: 17/745,359

(22) Filed: May 16, 2022

(65) Prior Publication Data

US 2022/0360116 A1   Nov. 10, 2022

Related U.S. Application Data

(63) Continuation of application No. 17/057,799, filed as application No. PCT/IL2019/050587 on May 23, 2019, now Pat. No. 11,342,797.

(Continued)

(51) Int. Cl.
*H02J 50/30* (2016.01)
*H02J 50/60* (2016.01)
(Continued)

(52) U.S. Cl.
CPC .............. *H02J 50/60* (2016.02); *H02J 50/30* (2016.02); *H02J 50/80* (2016.02); *H02J 50/90* (2016.02); *H02J 2310/12* (2020.01)

(58) Field of Classification Search
CPC .. H02J 50/20; H02J 50/30; H02J 50/60; H02J 50/80; H02J 50/90; H02J 2310/12; H04B 10/806; H04B 10/807
See application file for complete search history.

(56) References Cited

U.S. PATENT DOCUMENTS 7,133,617 B2   11/2006   Oettinger
10,223,717 B1   3/2019   Bell
(Continued)

FOREIGN PATENT DOCUMENTS

| CN | 1128607 A | 8/1996 |
| CN | 103649775 A | 3/2014 |

(Continued)

OTHER PUBLICATIONS

International Search Report and Written Opinion for PCT Appl. No. PCT/IL2019/050587, dated Sep. 1, 2019, 7 Pages.
(Continued)

*Primary Examiner* — Levi Gannon
(74) *Attorney, Agent, or Firm* — Maine Cernota & Curran

(57) ABSTRACT

A wireless power transmitter system for directing a high energy beam towards receivers fitted with identifying signs. One type of the identifying signs may have asymmetric shape properties, such that their mirror image cannot be matched to their actual shape, even after the image is rotated, tilted or otherwise geometrically manipulated. The system can thus determine whether a detected image of a sign is a true image received directly from said receiver, or is received after the imaged beam has undergone a reflection between the receiver and the transmission system. In the latter case, the system can prevent high power transmission from being directed to a location other than a real receiver, which could be a safety hazard. Other types of identifying signs may be located in or on the borders of different zones (Continued)

of a transmission space, to identify zones where transmission may be allowed or prohibited.

13 Claims, 6 Drawing Sheets

Related U.S. Application Data

(60) Provisional application No. 62/711,643, filed on Jul. 30, 2018, provisional application No. 62/675,313, filed on May 23, 2018.

(51) Int. Cl.
*H02J 50/80* (2016.01)
*H02J 50/90* (2016.01)

(56) References Cited

U.S. PATENT DOCUMENTS

| | | |
|---|---|---|
| 2003/0019931 A1 | 1/2003 | Tsikos |
| 2013/0285603 A1 | 10/2013 | Zeinstra |
| 2014/0176061 A1 | 6/2014 | Cheatham, III |
| 2017/0012463 A1 | 1/2017 | Lynch |
| 2018/0123403 A1 | 5/2018 | Kare |
| 2018/0301937 A1 | 10/2018 | Park |
| 2018/0342905 A1* | 11/2018 | Fukaya .................. H02J 50/20 |

FOREIGN PATENT DOCUMENTS

| | | |
|---|---|---|
| JP | 2010510766 A | 1/2007 |
| JP | 2008245404 A | 10/2008 |
| WO | 2017033192 A1 | 3/2017 |

OTHER PUBLICATIONS

International Preliminary Report on Patentability for PCT Appl. No. PCT/IL2019/050587 dated Dec. 3, 2020, 5 pages.
Office Action for U.S. Appl. No. 17/057,799, dated Aug. 4, 2021, 17 Pages.
Notice of Allowance for U.S. Appl. No. 17/057,799 dated Jan. 26, 2022, 9 pages.
Extended European Search Report for EP Appl No. EP19807530.1 dated Feb. 9, 2022, 4 pages.
Translation of Office Action for CN Application No. 201980047197.5 dated Sep. 14, 2023, 8 pages.
Translation of Office Action for JP Application No. 2020-565809 dated Apr. 20, 2023, 2 pages.

* cited by examiner

WIRELESS POWER SYSTEM HAVING IDENTIFIABLE RECEIVERS

RELATED APPLICATIONS

This application is a continuation of U.S. patent application Ser. No. 17/057,799, filed Nov. 23, 2020, which is a national phase application filed under USC § 371 of PCT Application No. PCT/IL2019/050587 with an International filing date of May 23, 2019, which claims the benefit of U.S. Provisional Patent 62/711,643 filed Jul. 30, 2018 and U.S. Provisional Patent 62/675,313 filed May 23, 2018. Each of these applications is herein incorporated by reference in its entirety for all purposes.

FIELD OF THE INVENTION

The present invention relates to the field of power transmission of beams for providing energy to remote receivers, especially relating to the safe operation of such systems by ensuring only power transmission directly to authorized receivers and in areas where it is permitted to receive the power transmission.

BACKGROUND

There are many wireless power systems known in the art. However, there do not appear to be any commercial systems available which are able to transmit enough power, in accordance with safety regulations, over a reasonable distance for an office or domestic environment, to operate portable electronic devices, such as smartphones and laptops which require significant charging power, running to over 10W in many cases.

The need for wireless power transmission systems is generally accepted as a long-existing need, perhaps since the pioneering work of Nikola Tesla at the beginning of the twentieth century. Some such proposed wireless power systems are based on transmitting electromagnetic beams to photovoltaic cells or to antennae on a receiver, others are based on transmitting an ultrasound beam, or other types of power beams to the receivers.

Such suggested transmitting devices are referred to in this disclosure as "transmitters" and may use a laser beam, or another high-energy beam, to supply receivers with power. The "receivers" referred to in this disclosure typically refer to portable electronic devices, equipped with a photovoltaic cell to convert the beam received by the transmitter to usable energy, to enable charging of their battery without the need to plug the device into a physical socket.

In such systems, the transmitter may identify the receiver by receiving from it, a retro-reflection of the transmitted beam, and/or receiving a wireless communication from it. Typically, a room where it is expected that receivers which need charging will be found, is scanned using either the laser beam emitted by the transmitter on a low power setting, or a separate RF or ultrasound beam. Once a transmitter has located a receiver, the transmitter may use a scanning mirror to direct its beam towards the identified receiver for charging.

In International Patent Publication WO2017/033192, for "Wireless Power Distribution System", having common ownership and some common inventors with the present application, a system is described in which a minimal amount of energy is transmitted to the receiver before the receiver can provide a response, thus identifying itself to the transmitter, before enabling transmission of full power from the transmitter. In other applications, such as in those disclosed in International Patent Publication WO2009/083990 for "Wireless Laser Power Transmitter", having common ownership and a common inventor with the present application, there is described a system in which a handshake between transmitter and receiver is performed before full wireless power transmission can commence.

Typically, the searching mode low power setting is chosen so that it is below the safety limit for the human eye, or below a regulatory safety threshold. Such limits have been set by government regulation, such as the current US regulations of April, 2018, and other similarly accepted regulations. However, systems using these safety thresholds have generally been implemented with human safety in mind, but do not necessarily take into consideration other "systems" that may be even more susceptible to damage by a laser beam, such as laboratory or medical equipment, cameras, communication systems, and the like, which may be sensitive to even lower power beams than the human eye. Thus, when the transmitter emits a beam, even at a low power setting, and even if for a very short time, equipment sensitive to laser beams in the path of the beam may be damaged. Therefore, such systems should be able either to identify such sensitive instruments and avoid scanning them, or more practically from all aspects, to utilize a system which ensures that the transmitter can only direct its lasing onto receivers after having identified them.

The systems of the prior art have a number of problems, which may imply an unacceptable safety hazard for certain situations. Even in systems where the location of receivers is known to the transmitter, and thus scanning is not needed to identify the receivers and their location, the beam may be diverted or reflected by objects in the path between the transmitter and receiver, especially if the receiver is located within an optically complex environment, such as the domestic environment.

Furthermore, even in a system in which a low power beam scans a space, intending to find receivers and transmit power to them, the size of the receiver retro_reflector used to alert the transmitter of the presence and location of a receiver, may be only of the order of a millimeter or so. The searching beam should thus have a size of similar or slightly larger dimensions. If such a beam is scanned in a raster or spiral pattern, the distance between scanning paths should therefore be no larger than that millimeter, in order to ensure positive location of the receivers, and such a dense scanning pattern would then take an inordinate length of time. Furthermore, it would be useful to have a higher-powered signal while performing the scanning, in order to ensure positive identification and login of the receiver.

There therefore exists a need for a system and methods that overcome at least some of the disadvantages of the prior art, and in particular, to reduce to a minimum the risk of lasing towards sensitive objects or in forbidden areas.

The disclosures of each of the publications mentioned in this section and in other sections of the specification, are hereby incorporated by reference, each in its entirety.

SUMMARY

Should a wireless power transmitter falsely identify a location as a receiver, the transmitter may direct a high-energy beam towards that location which may result in damage by the beam. For example, if an image of a receiver is reflected by a mirror, the transmitter may mistakenly identify the reflection as the receiver, and direct a beam at the image of the receiver in the mirror. This may cause dangerous reflections to occur as the beam may be directed by the mirror onto sensitive equipment which may be damaged by this reflection, or have other unintended consequences. It is important therefore that the transmitter is supplied with the true location of these receivers, as a beam emitted by a transmitter may damage humans or equipment in the room should it be directed onto unintended areas.

To solve this problem, the present application describes novel receivers equipped with a special or unique sign. The sign may be associated with the location of receivers, or may be embedded in an actual receiver. In order to identify the location of receivers, which may be located in arbitrary locations within the scanned space or may move around, the transmitter may scan the space using, among other systems, a camera or a low power beam to identify the position of these signs. The transmitter is equipped with a detector which identifies these signs within its field of view, and uses them to identify the precise location of receivers.

One key feature of the presently disclosed systems is that such signs are distinguishable from a mirror image of themselves. Thus if a surface unintendedly reflects illumination from a sign, the image of the sign rendered by this reflection is distinguishable from the original shape of the sign, being a mirror image thereof. Therefore, should the system scan the room and image a reflection of the sign, the image of the sign obtained would be geometrically distinguishable from the original sign.

The system would thus be programmed to recognize that detection of a reflected, mirror image of a sign, means that the direction of the detected reflection does not represent the true location of a receiver, and therefore should not direct a high-energy beam towards that reflected image. To do so would result in the directing of a high powered laser beam at the reflecting surface, thinking that the virtual image was in the real direction of the real sign. The result could be breakage of the reflecting surface, with subsequent uncontrolled propagation of the high power beam into the scanned space, or scattering of the laser beam into dangerous directions, or other undesired and potentially dangerous or damaging situations, as will be described hereinbelow. This ensures that mirrors or other surfaces generating reflected images of signs are not mistakenly identified by the system as being real receivers, and thus transmitters are prevented from directing beams towards these virtual locations of the signs on the receivers. Therefore, the transmitter can more accurately identify the location and position of a receiver, distinguishing between a direct line of sight and a reflected beam path.

The detector may acquire an indication of the sign through any of the following methods:
  (i) scanning the room with a low power beam emitted by the transmitter, that is intended to be reflected and returned by the sign to the detector associated with the transmitter,
  (ii) the detector being adapted to detect a signal that is actively transmitted by the sign,
  (iii) a signal that is reflected by the sign, from ambient power available in the surroundings, such as from artificial or natural light sources (the most common form) or by scattering radio waves such as Wi-Fi signals or by using other energy sources in the surroundings, or,
  v) detection of a series of short optical pulses either generated by an optical emitter in the receiver, or reflected by the receiver.

All such signs may be termed as having special signatures, in that they can be used to uniquely define any one of their position and orientation relative to the transmitter. Furthermore, the detector should be able to determine whether the sign being detected is a result of a direct line of sight from the sign to the sensor or from the transmitter to the sign, or whether it is being detected as a result of a reflection en_route, which would indicate a potentially hazardous situation. Such a determination is possible with special signatures of the type described in this disclosure, since the sign is such that its mirror image is distinguishable from a direct image of it. Therefore, an image resulting from an unintentional reflection, can be distinguished from a directly detected image, and appropriate safety precautions may be taken because of the danger which could arise from an unintentionally reflected beam. Definitions and explanations of what constitutes a mirror image, and how to determine whether an imaged sign is a mirror image of the original sign or not, are further expounded in the Detailed Description section hereinbelow.

The systems of the present disclosure use any of the following methods to determine operational parameters based on such identifiable special signs.

A. Scanning the room to first identify receivers, a portion of the field of view of the transmitter using either (a) no power, such as can occur when the receiver is detected in the scan by the reflection from its surface of power from the surrounding, if it has a barcode for example, or if the receiver generates the power internally, such as by a blinking LED source, or (b) a power level that is within safety regulations for people, animals, property and equipment which potentially exist in the field of view of the system. Such a scan may be performed by either (i) the transmitter, for example by pointing the laser in different directions and collecting data for each direction in order to assemble a "picture" of the space, or (ii) by imaging the area using a camera or another sensor or (iii) the receiver itself, for example taking a picture of the transmitter using a camera, or (iv) an additional component, for example, a security camera, or a dedicated camera or some other device capable of "mapping" the room. Scanning may be performed optically, or by receiving potential coordinates from an external or preset source. Typically, such a scan may be performed by a camera, viewing the vicinity, or by a low power scanning laser beam, by receiving communication messages from receivers, or by an input of data from an external source, such as user input, or communication from an external source including coordinates and data representing the result of such scan. In addition, scanning may be performed using radio transmissions in a radar-like system, or using ultrasound. Typically, the power level of the scan should be set by the user or manufacturer. Such a scan may be performed at any time, but is typically performed at the user's request, or at system setup, or periodically during the system's operation.

B. The data is integrated over a first time period. Typically, a sign is identified as having a higher contrast ratio compared to the environment. The system may collect information regarding the approximate position of the receiver associated with the scanned portion of the field of view. Contrast ratio, as used in the context of this disclosure may be defined as the ratio between the RMS signal when the scanning beam is on a mark and the RMS signal when the scanning beam is not on a mark. Alternatively contrast ratio may be the RMS value of the signal collected from a sign divided by the mean/average/arithmetic mean or median signal collected from the same sign.

C. If an indication of a sign is obtained, the system may then examine that portion of the field of view in closer detail.

Typically, the image obtained is compared to an image selected from a database of images or to a signature pattern, such as a barcode, in which case, the procedure may check that the resulting number has a special mathematical property, such as the remainder when dividing by a large prime number. The observed image may be rotated, cropped, magnified or reduced in size by a simple linear transformation during the comparison procedure. Rotation may typically be performed in 3D, but a 2D rotation may be enough, especially in systems having a low Field of View.

The comparison image may be a set of electronic data in memory, and the comparison may be performed using a convolution-like algorithm, although other pattern matching algorithms could be used. Alternatively, when scanning the portion of the field of view in closer detail, the sign may actively send a signal, such that the system can be used to positively identify the sign without or in addition to the need to compare an image with a database of images in memory. D. When a sign is identified by the transmitter or by another element of the system, an instruction for modifying the operational parameters of the transmitter, as can be deduced from the sign, may then be acted upon by the transmitter. For example, if an identified sign represents the position of a receiver, the transmitter may begin wireless power transmission towards that identified location.

Each sign may comprise a pattern in space, such as a barcode, or in time, such as a series of pulses emitted by a LED, or in spectral space, such as a combination of wavelengths, that is identifiable by the transmitter or by the receiver or by another element in the system and may be interpreted as numeric data.

Most signs should be identifiable, at least in part, by scanning using the same wavelength and more specifically, typically by the same beam, as that used by the system to transmit power from the transmitter to the receiver(s). Typically, this is required for signs that are both location related, such as the position of receivers, and/or safety related, such as the type of receiver. The numeric data should be unique enough so that the probability of mistakenly decoding the data from a random noise pattern in the surroundings is very low, typically below 1 occurrence per week, or even lower, or if measured in probability terms 1:1,000 or 1:1,000,000 or even lower.

Such uniqueness may be measured by bits of information received from the sign. In such a case, a sign may transmit at least 10 bits, or even 20, 40 or more bits of data to the transmitter.

A typical sign may be constructed in several ways:

Structure A: A high contrast optical shape such as a barcode, QR code or other similar shapes, specifically important are irregular asymmetric shapes, that are distinguishable from their mirror image. The image may be multi-color, or multi- IR color, or have a response in multiple wavelengths.

Structure B: A retro reflective shape

Retro reflective shapes have an advantage in that they are easier to detect. The retro reflective shape may include a filter for retro reflecting only a subset of all wavelengths.

The retro reflective shape may also consist of areas which have different reflectivities.

Structure C: A light emitting shape

A light emitting shape, such as an LED light, or a pattern of LED lights, or any other light emitting devices. The pattern may also be time dependent, so that a single LED can produce a code that may be identifiable by the transmitter. Laser diodes or phosphorescent or fluorescent structures may be used instead of LEDs.

Structure D: An RF emitting "shape", RF emitting component (or antenna) that emits a time changing or a frequency changing signal that may be identifiable by the transmitter.

Structure E: A combination of at least some of the above structures.

The transmitter may be equipped with a sign identification system, which may be aligned with the laser beaming system. Alternatively, a sign-identification system may be connected to a transmitter using either a wired or wireless connection.

The sign identification system may comprise an external aperture and a maximal range. The external aperture is typically less than 2% of the maximal range.

Optical alignment of the sign identification system to the laser scanning system, in the context of this disclosure, means the identification of the position of the sign relative to the position of the laser. This may be in the form of a mathematical formula, or a table (at distance 1 and angle 2, correct 2 points up) or a mapping function of at least one coordinate from the sign identification system to the laser beaming system, or a mapping function of at least one coordinate from the laser beaming system to the sign identification system. For example, in the case of a detector consisting of a CCD array, the optical alignment may be determined by a table indicating the pixel that is aligned to the laser for a specific range and direction (in many cases the same pixel will work for different ranges). As the center of the CCD field of view may be slightly off, relative to the laser, at each point in space a different pixel may represent the position of the laser. Alignment means that the system includes such a "translation" from the CCD/sensor image to the laser coordinates.

Optical alignment may be achieved mechanically by connecting the sign identification system to the laser beaming system with a typically rigid mechanical mount so that the optical position of the sensors relative to the charging beam is essentially fixed or has a known behavior whether thermal or temporal. Such a connection usually requires an accurate rigid structure, or use of a method for determining the dynamic alignment.

Optical alignment may also be achieved optically by having at least part of the sensors dynamically configurable based on measurement of their position relative to the beam. For example, in the case of a position sensitive detector, optical alignment may be achieved by setting a bias to the detector so that the signal generated plus (or minus) the bias is aligned to the laser.

Optical alignment may also be achieved algorithmically.

Optical alignment may also be achieved using a combination of the above methods.

An asymmetric sign enables unique definition of position and alignment of the receiver, in that its mirror image is different from itself, and also enables the position of the target, usually the center of the photovoltaic cell (PV), to be determined, since the sign is located in a predefined position relative to the PV target. However, since the sign is also much larger than the retro reflector at the center of the PV, finding it is much simpler than finding the center of the PV, since the sign needs a lower density scan to find it, and generally collects and reflects a larger signal.

The sensor rise time is the shortest time the output of any of the sensors change by at least 20%, and preferably 50-90%, between the output value generated when the system is not aimed on a sign, and the output value generated when the system is aimed at a sign.

The sensor fall time is the shortest time the output of any of the sensors change by at least 20%, and preferably 50-90%, between the output value generated when the system is aimed on a sign, and the output value generated when the system is not aimed at a sign.

The value [RMS signal$_{on\ sign}$] is the maximal RMS of the signal, generated by any sensor, when the system is aimed at a sign.

The value [RMS signal$_{not\ on\ sign}$] is the minimal RMS of the signal, generated by any sensor, when the system is not aimed on a sign (typically averaged over an environment).

Once that time t has elapsed, and preferably somewhat longer to ensure positive identification, the transmitter can determine if a sign is an instruction or an information sign or is not a valid sign.

Such signs may provide instructions or information to the transmitter regarding the surroundings of the transmitter and/or the status and type of the receiver. Such instructions typically limit or modify the maximal or average laser exposure around objects that are not positively identified as receivers. The present disclosure also describes identifiable signs that indicate additional information, such as identification of specific receivers, receiver types, identification of unique areas such as those for providing preferred service, reduced exposure, those with windows, and the like.

According to a further implementation of the signs described in the present disclosure, signs or patterns may be used to indicate different "zones", representing different characteristics of the region over which the transmitter is intended to transmit, for example:

Indication of the center and extent of a preferred charging zone, which may for instance, be a sign indicating a zone densely populated with receivers.

Indication of the center and extent of a non-charging zone e.g. a zone not populated by many receivers.

Indication of a corner or an edge of a preferred charging zone

Indication of a corner or an edge of a non-charging zone

The user may define the edges or contours of the various regions with coded labels which are identified by the transmitter scanner. Such labels may be interpreted as corners, pivot points, centers of curvature, inflection points, centers of radii, or other geometrical features which the transmitter is capable of interpreting. Alternatively, the coordinates of the various regions may be programmed into the scanner with relevant instructions to the transmitter as to what actions are allowed to be taken in each defined region.

In such a system, if the transmitter detects an instruction sign the transmitter acts accordingly, typically by modifying, if needed, the configurational parameters of the system.

If the sign detected is interpreted as an indication of the center and extent of a preferred charging zone, the transmitter may be configured so that it may prefer searching for receivers in that zone, or may supply more power to receivers in that zone or may assign a higher priority to charging receivers in that zone. More complicated signs may also exist, such as preference to a specific type of receivers, or preference to a specific receiver under specific conditions, such as maximal power drawing.

If the sign detected is interpreted as an indication of the center and extent of a non-charging zone then the transmitter may be configured so that it may deny power supply to receivers within that zone, or to specific type of receivers in that zone.

If the sign detected is interpreted as an indication of a corner or an edge of a preferred charging zone, then the transmitter may be configured so that it may seek out other corners of that zone to define the directions and positions of the preferred charging zone.

If the sign detected is interpreted as an indication of a corner or an edge of a non-charging zone, then the transmitter may be configured so that it may seek out other corners of the zone to define the directions and positions of the non-charging zone.

If the sign detected is interpreted as an indication of a modified operational parameter zone, such as:

Reduced charging rate—a zone wherein maximal or average power draw is limited;

Increased charging rate—a zone wherein average power draw is allowed to be increased, such as in inaccessible areas where safety rules can be relaxed;

Reduced/increased scan speed—a zone wherein scanning for receivers is performed at a different rate or for a different density of receivers, such as in places where the maximal achievable range is limited;

Preferred zone— A zone in which scanning or powering is preferred;

Reduced power zone; or

High/low/specific priority zone;

then, the transmitter may be configured so that it may act accordingly, and change the operational parameters when operating to within that zone.

If the sign detected is interpreted as an indication of some special point in space, such as for calibration, to define the center of operation, an entrance, windows, mirrors, the edges of mirrors, the edges of a window, an obstructed field of view, safety hazards, or the like, the transmitter may change the operational parameters of the system in response to detecting such a sign, such as avoiding directing a beam towards those areas, or directing only beams with special parameters towards it, or modifying some other parameter of the system when aimed at those directions.

If the sign detected is interpreted as an indication of an environment with different characteristics, such as the dense receiver environment encountered in an environment such as a coffee_shop or train station, or a low density receiver environment, such as an environment known to have a single client, optimization of the transmitter operation in such an environment may be different, by performing a different level of search or searching in a different manner. Also, in many cases, the transmitter in a low receiver density environment may be configured to power a receiver when it locates it, while in a dense environment the transmitter may first complete locating all receivers and then prioritize them.

If the sign detected is interpreted as an indication of a receiver's license and legal status, then the status and ID may be compared against a database for any special instructions regarding that receiver, or may be validated, and further action may be performed based on such comparison or validation.

If the sign detected is interpreted as an indication of a receiver's position or that of another target, which may be near the sign itself and indicating the direction and distance of the receiver, or even on the receiver indicating the actual target (PV) at which to aim the power beam (such a configuration may reduce the time needed to locate a receiver, due to the larger dimensions of the sign compared to the marking on the target itself) then the system may search for receivers in the coordinates indicated by the sign.

If the sign detected is interpreted as an indication of at least some of a receiver's manufacturer and/or serial number and/or power capabilities, and/or license number, then the system may update a record, typically electronic, with the date, or may modify its operational parameters based on the interpreted data. Such operational parameters may include the denial of power for a receiver, limiting maximal power for a receiver, requesting additional data from the receiver or from another source, initiating a payment procedure, calibrating internal sensors, providing the receiver with operation relevant data, or similar limitations. The operation relevant data may include such data as firmware update, calibration data, time and date, transmitter information, geographical data, or the like.

If the sign detected is interpreted as an indication of client capabilities, such as power requirements and usage model, then the system may update a record, typically electronic, with this data. Alternatively, the system may modify its operational parameters based on the interpreted data. Such changes to the operational parameters may comprise denying power to a receiver, limiting maximal power for a receiver, requesting additional data from the receiver or from another source, initiating a payment procedure, calibrating internal sensors, providing the receiver with operation relevant data, such as updates (including firmware updates), calibration data, time and date, transmitter information, geographical data.

If the sign detected is interpreted as an indication of a temporal non-charging zone or temporal limited power zone, then the system may suspend charging for that zone until a predetermined time has elapsed, or until the sign is removed, or until another indication is received by the system.

If the sign detected is interpreted as an indication of a number of targets and their relative positions, then the system may seek out those targets, and cease seeking targets once all the targets are located.

There is thus provided in accordance with an exemplary implementation of the devices described in this disclosure, a method of safely directing a beam from a wireless power-supplying device towards at least one power-receiving device, the method comprising:
 (a) scanning a field of view for detection by the power-supplying device of at least one sign having at least one asymmetric property associated with at least one power-receiving device,
 (b) upon detection of at least one of the signs, recording the scan pose at which the at least one detected sign was obtained,
 (c) from a database containing one or more representations of signs associated with at least one power-receiving device, the signs having at least one asymmetric property, performing a sign-matching algorithm which maps the at least one detected sign onto at least one of the representations,
 (d) if it is determined by the sign-matching algorithm that the detected sign matches a representation of a sign contained in the database, deducing that the detected sign indicates that a beam directed from the scan pose does not undergo a reflection, such that a direct line of sight between the power-receiving device and the wireless power-supplying device is indicated, and
 (e) performing at least one of (i) directing at least one beam towards the at least one power receiving device and (ii) modifying an operational parameter of the wireless power-supplying device.

In such a method, step (e) may be independent of a sign-matching algorithm performed by mapping a mirror image of the detected image onto any of the representations of asymmetric signs contained in the database. The sign-matching algorithm of the above methods, may additionally be performed by mapping a mirror image of the detected image onto any of the representations of asymmetric signs contained in the database. In that case, the modifying of operational parameters may include preventing wireless power supply if the mirror image of the detected image maps onto any representations of signs contained in the database.

In any of the above methods, step (e) may be only performed if the sign-mapping algorithm determines that the detected image is not representative of a mirror image of a sign contained in the database.

According to yet another exemplary method, at least one of (i) the position and (ii) the orientation (iii) the co-ordinates in space of the receiver may be determined by at least one of the detected sign and the scan pose.

In all of these methods, the signs may also be representative of different zones, the zones representing different frequencies of receivers. These zones may be any of charging zones, non-charging zones, high-frequency receiver zones or reduced power receiving zones. Additionally, in these methods, at least one of the signs may demarcate at least one feature of a zone. Such demarcation may comprise providing information regarding at least one of the area, extent, boundary, corners, radius, center of a zone.

According to further implementations of the above described methods, at least one sign (i) may be attached to at least one receiver, (ii) may be embedded within a receiver (iii) may have a fixed position relative to at least one receiver or (iv) may contain information regarding the location of at least one receiver.

Additionally, the sign-matching algorithm may include at least one of rotation of the image and a zoom operation on the image.

According to another alternative implementation of the systems of the present disclosure, there is further provided a system for safe wireless power supply to at least one receiver, the system comprising:
 (a) a transmitter adapted to emit wireless power,
 (b) a detector configured to detect at least one sign having at least one asymmetric property, associated with at least one receiver, and
 (c) at least one controller, the at least one controller adapted to:
  (i) receive signals from the detector,
  (ii) record a pose at which a sign was detected by the detector,
  (iii) access a database containing one or more representations of signs associated with at least one receiver, the signs having at least one asymmetric property,
  (iv) execute a sign-matching algorithm which maps a detected sign onto at least one of the representations,
  (v) determine that the detected sign matches at least one representation of a sign contained in the database, and
  (vi) perform at least one of instructing the transmitter to direct at least one beam towards the at least one power receiving device and modifying an operational parameter of the wireless power-supplying device.

In such a system, the determining by the controller may indicate that a beam directed in the pose did not undergo a reflection, such that a direct line of sight between the at least one receiver and the transmitter is indicated. In either of these systems, the operation of the controller may comprise (i) utilizing the recorded scan pose to direct a beam towards the at least one receiver and (ii) modifying an operational parameter of the transmitter.

There is even further provided, according to the present disclosure, a system for transmitting optical wireless power from a transmitter to at least one receiver, the system comprising:
(i) at least one transmitter adapted to emit a beam of optical wireless power, the at least one transmitter being configured to direct the beam towards the at least one receiver, and the at least one receiver being adapted to convert the beam into electrical energy, and
(ii) a sign identification system associated with the at least one transmitter, the sign-identification system adapted to identify signs associated with the at least one receiver, wherein the sign identification system is adapted to distinguish an image of at least one sign from a mirror image of the at least one sign.

In this system, the mirror image may be distinguishable from an image of the sign even after at least one of (i) rotation of any magnitude about an axis perpendicular to the plane of the sign, (ii) rotation of less than 90° about an axis in the plane of the sign, and (iii) magnification or reduction of the image (iv) rotation of the image, and (v) after a zoom operation on the image.

Additionally, the sign identification system may include at least one sensor, and the sign may have an area of at least $10^{-8} m^2$, divided by the number of sensors. In such, the at least one sensor should be essentially aligned to the beam. Furthermore, the system may be adapted to have a maximal range of operation. In that case, the sign identification system may further comprise an external aperture having a radius which is less than 2% of the maximal range of operation. In any of these systems, the beam may be a laser beam. In that case, at least one sensor may be mechanically connected to the laser by a rigid connection. Additionally, a sign may be at least one of (i) attached to at least one receiver, (ii) embedded within a receiver (iii) having a fixed position relative to at least one receiver (iv) containing information regarding the location of at least one receiver. Furthermore, the sign-identification system may be adapted to execute a sign-matching algorithm which maps the at least one detected sign onto at least one item from a database containing one or more representations of signs, the signs being associated with at least one power-receiving device and having at least one asymmetric property.

According to yet further implementations described in this disclosure, there is also provided an optical sign for communicating information to a wireless laser power system having at least one sensor for detecting the sign and a field of view, the optical sign being characterized in that:
(i) an image of the optical sign generated by the wireless laser power system, is distinguishable from a mirror image of the optical sign,
(ii) the optical sign has an area of at least $$\frac{10^{-8} \text{ meter}^2}{\text{number of } Tx \text{ sensors}}$$

where "number of Tx sensors" is the number of the at least one sensor, and
(iii) the optical sign contains information which provides instructions to the wireless laser power system to adjust its operational parameters, when the optical sign has been located within the field of view for a time lasting at least:

$$t > \frac{4*(\text{sensor rise time} + \text{sensor fall time})}{[\text{Number of sensors}] * \log_2\left(1 + \frac{RMS\ signal_{on\ sign}}{RMS\ signal_{not\ on\ sign}}\right)} \text{ seconds,}$$

Where:
the sensor rise time is the longest rise time of any of the at least one sensor,
the sensor fall time is the longest fall time of any of the at least one sensor,
the "RMS signal on sign" is the maximal RMS signal from any of the at least one sensor when the sign is within the field of view, and
the "RMS signal not on sign" is the minimal RMS signal from any of the at least one sensor when the sign is not within the field of view.

Further implementations of the present application, describe a sign for providing information to a wireless power supply system, the sign having symmetry properties such that an image of the sign generated by at least one of (i) a direct reflection from the sign to the wireless power supply system and (ii) a direct emission from the sign to the wireless power supply system, is distinguishable from its mirror image,
wherein the wireless power system comprises at least one sensor for detecting the sign, such that the sensor can determine whether the detected sign was acquired through a direct line of sight from the optical sign or whether the detected sign was obtained by a reflection in the laser beam path. In such a case, the wireless power supply system should be provided with instructions to adjust its operational parameters according to the information provided by detection of the sign. Then, the provision of instructions may comprise instructions pre-encoded, or instructions received from a database, or instructions received over a network or through a wired connection. The sign itself may comprise at least one of optical, electric, or electromagnetic data.

There is further provided a method of efficiently directing a beam from a wireless power-supplying device towards at least one power-receiving device, the method comprising:
(a) scanning a field of view for detection by the power-supplying device of at least one sign associated with at least one zone,
(b) upon detection of at least one sign, recording the scan pose at which the at least one detected sign was obtained,
(c) from a database containing one or more representations of signs associated with different zones, performing a sign-matching algorithm which maps the at least one detected sign onto at least one representation of a sign contained in the database, and
(d) if it is determined by the sign-matching algorithm that the detected sign matches at least one representation of a sign contained in the database, instructing the wireless power supply system to operate in accordance with a pre-determined protocol associated with the determined zone.

In such a method, the instruction may comprise scanning a field of view associated with the detected sign, or it may comprise preventing the wireless power-supplying device from either scanning or directing its beam towards a field of view associated with the detected sign. Additionally, at least one of the signs may demarcate at least one feature of a zone, and the demarcation may provide information regarding at least one of the area, extent, boundary, corners, radius, center of a zone. Additionally, the at least one sign may have at least one asymmetric property, such that the sign-matching algorithm can distinguish between a mirror image of a sign and its original image.

Even further systems of the present disclosure may be in order to provide efficient wireless power supply to at least one receiver, such systems comprising:

(a) a transmitter adapted to emit wireless power,
(b) a detector configured to detect at least one sign associated with at least one zone, and
(c) at least one controller, the at least one controller adapted to:
  (i) receive signals from the detector,
  (ii) record a pose at which a sign was detected by the detector,
  (iii) access a database containing one or more representations of signs associated with different zones,
  (iv) execute a sign-matching algorithm which maps a detected sign onto at least one representation of a sign contained in the database,
  (v) determine that the detected sign matches at least one representation of a sign contained in the database, and
  (vi) operate the wireless power supply system in accordance with a pre-determined protocol associated with the determined zone.

In such a system, the operation of the controller may comprise at least one of scanning a field of view associated with the detected sign and directing at least one beam from the transmitter towards the at least one receiver associated with the detected sign. The controller may further be adapted to prevent the wireless power-supplying device from either scanning or directing its beam towards a field of view associated with the detected sign.

In any of the above described methods, the scanning may be performed by steering a beam emitted by the wireless power-supplying device, such that the beam reflected off the at least one sign travels in the reverse direction as that of the scanning beam, from the wireless power-receiving device to the wireless power-supplying device.

Finally, any of the above described systems may further comprise a scanner adapted to scan a field of view for detection of the at least one sign. Furthermore, the transmitter may comprise a scanning mirror, such that the transmitter is adapted to scan the field of view with a beam of the wireless power, such that the beam is reflected off the at least one sign and travels in the reverse direction as that of the scanning beam. In such a situation, the transmitter may further comprise a beam splitter for directing the reversed beam towards the detector.

BRIEF DESCRIPTION OF THE DRAWINGS

The present invention will be understood and appreciated more fully from the following detailed description, taken in conjunction with the drawings in which.

DETAILED DESCRIPTION

Figure 1A:
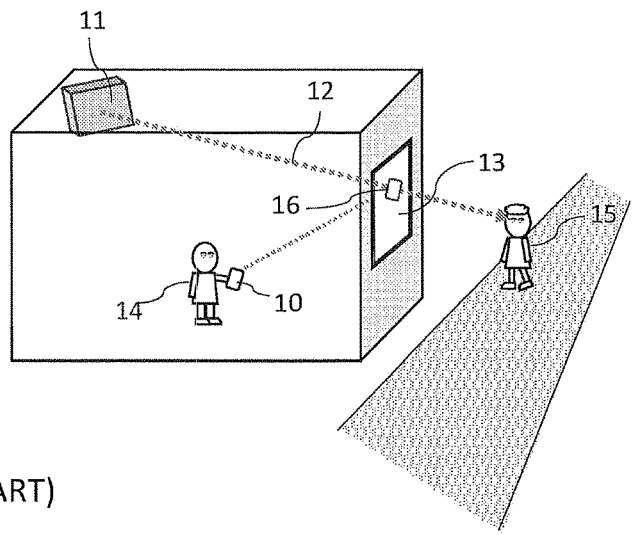
FIG. 1A shows a schematic illustration of a prior art power transmission system with a beam impinging on a reflective surface and being detected by the sensor system.

Reference is first made to FIG. 1A, which schematically illustrates an exemplary prior art system for transmitting optical power to a hand-held portable device, in which the transmitter can mistakenly identify an incorrect receiver location because of a reflection of the beam in a reflective surface, such as a mirror or a window, increasing the risk of damage to people or sensitive equipment.

In FIG. 1A, a receiver 10 held by the user 14 is located within the transmitter's 11 field of view. However, the transmitter 11 has located an image 16 of the receiver 10 from the reflection of the receiver itself 10 in the window 13, and has thus been given permission by the system to transmit a power beam 12 to the supposedly identified "receiver" 16, believing it to be the real receiver. As the window transmits over 90% of the incident beam, this high power travels beyond the window 15, and may cause damage to a person 15 passing by, or to sensitive equipment situated along the beam path outside of the window 13.

Furthermore, damage to the partially reflective window surface 13 may occur, as it may not be able to handle such a large power level, and may therefore be damaged, causing diffused scattering of the power beam, or may even break, though in that case, the reflected beam back to the sensor would disappear, causing cessation of power transmission and a return to the scanning mode. The transmitter may also mistakenly direct a beam at a reflective flammable surface, increasing the risk of fire-related damage.

Furthermore, in systems where multiple transmitters are used, a reflected beam may intersect a beam emitted by a different transmitter, even in systems where direct intersection would be prevented. This may have unintended and even dangerous consequences, as the combined beam may be more powerful than safety requirements allow. Furthermore, should a beam mistakenly be directed onto an unintended surface, the surface may diffuse the beam, causing the beam to be scattered around the room. Alternatively, a surface may split the beam into random directions, causing unintended damage to sensitive objects or equipment.

Thus, any reflective surface, whether fully reflective or only partially reflective, such as mirrors, irises of humans, animals and cameras, glass surfaces, metallic surface and sensitive equipment, among other examples, could present a hazardous situation should a beam be mistakenly directed onto them.

Figure 1B:
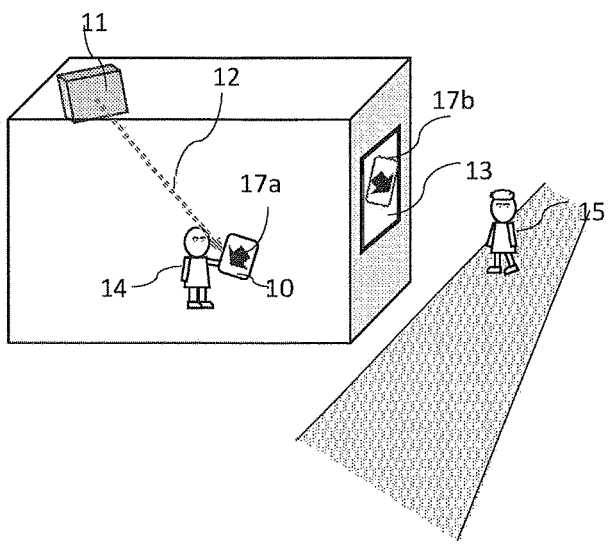
FIG. 1B shows a schematic illustration of the situation shown in FIG. 1A, but incorporating a system according to the current disclosure, differentiating between an image of a receiver being displayed by a reflective surface and an image of an actual receiver viewed directly.

Reference is now made to FIG. 1B, which illustrates schematically an advantageous exemplary system in which a transmitter is able to correctly distinguish between light reflected or received from an actual receiver location, from light received from a virtual image of the receiver, generating false receiver locations.

In the embodiment shown in FIG. 1B, receiver 10 is equipped with sign 17a, which has an asymmetric shape, which makes it distinguishable from its mirror image, regardless of how the image of the shape is rotated, tilted, magnified, reduced, or cropped. When transmitter 11 detects an image of the reflection of sign 17a, shown as shape 17b in the reflective window pane 13, the image processing routines of the system determine that the image 17b being detected, cannot be matched to any of the acceptable image shapes expected from a real receiver, and correctly identifies that no actual receiver is located in that position. The system may do so by comparing the identified image with a database of signs, rotating and/or magnifying and/or tilting, and/or cropping the image received.

Alternatively, the transmitter may calculate the hash or another representation of the received image, based on a pre-determined algorithm. A database may contain representations of signs, in the form of digital signatures, hashes, numeric values associated with co-ordinates or other data representing geometric properties of the signs. If the image received by the transmitter is an image of a sign which has been reflected, then no match would be found by the sign-matching algorithm, as the sign is asymmetric, and thus a representation of its mirror image would not be present in a database of safe signs.

The transmitter thus ignores the reflected image of the sign 17b, preventing unsafe transmission to the image 17b from the reflective surface 13. The transmitter should correctly identify sign 17a as an actual location of a receiver, having a direct line of sight with the transmitter 11, and thus may direct beam 12 directly onto receiver 10.

Figure 2:
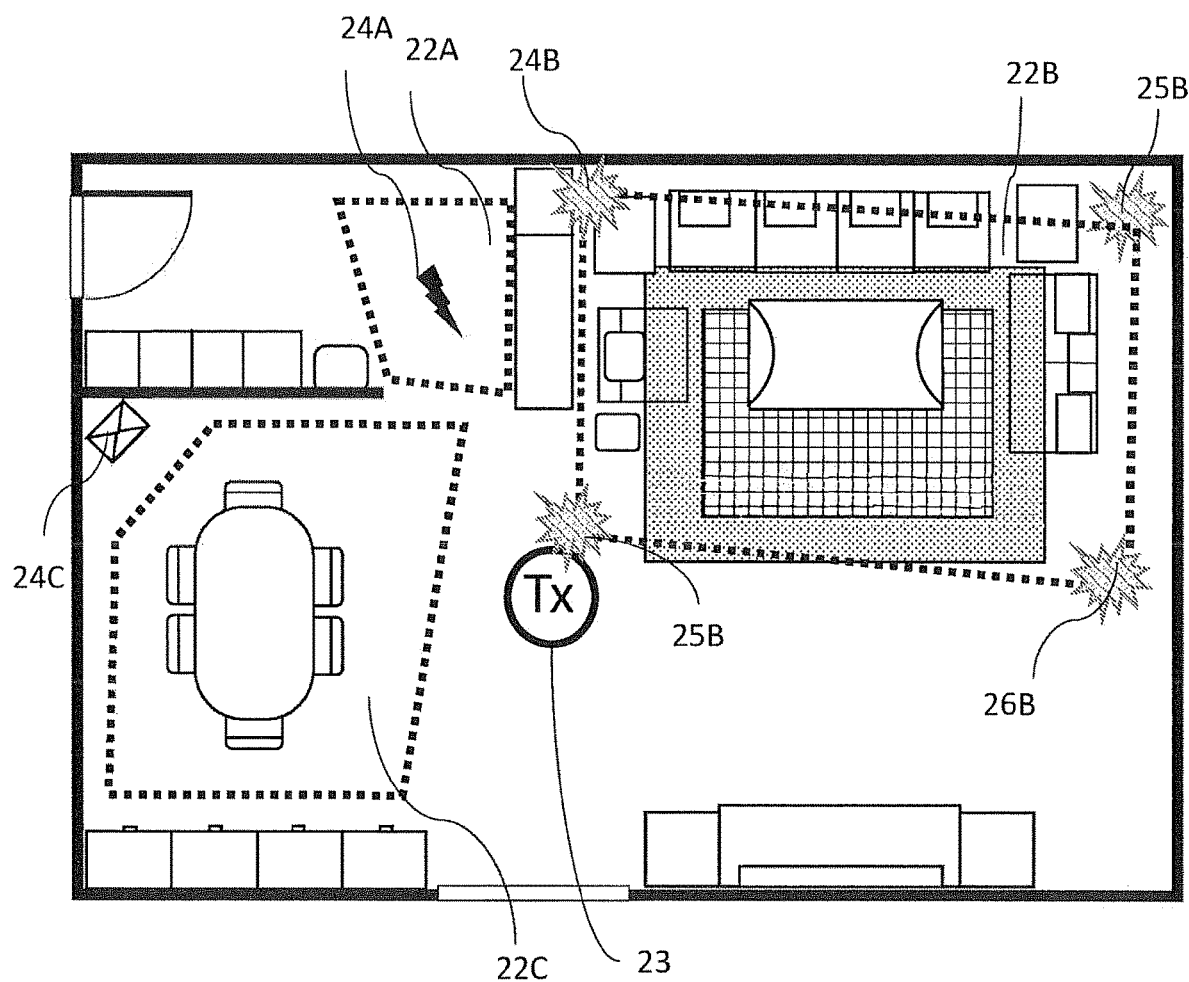
FIG. 2 shows a typical layout of a room with a transmitter covering the entire room, with several zones marked in the room, including the corners of zones, for defining, for instance, areas to which transmission is allowed, or prohibited.

Reference is now made to FIG. 2 which illustrates how recognizable signs may be used to delineate areas being preferred or forbidden for power transmission. FIG. 2 shows a typical plan layout of a room with a transmitter 23 intended to cover the entire room. Several different zones are marked in the room. In this example, there are shown two charging zones, 22B, 22C, and one non-charging zone 22A, each zone of which may be marked with one or more signs, either within the area of the zone or to define its extremities, borders or corners.

Thus, zone 22A is shown having sign 24A located in the center of the zone. Zone 22A is a non-charging zone, which may represent a sleeping area, a storage area, or an area in which receivers are not usually located, among other examples. The transmitter may identify the area of a zone by identification of a sign, and/or the extent or perimeter of a zone may be associated with the sign, thus signifying to the transmitter that on detecting such a sign, it should modify its transmission accordingly.

Zone 22B illustrates a charging zone, in which all four corners are identifiable to the transmitter using signs 24B, 25B, 26B and 27B. This is to illustrate an embodiment in which the transmitter identifies a zone by obtaining an image of more than one sign associated with a single zone, and thus can compute the area of that zone, or delineate the parameters and perimeter of the zone based on the location of these signs.

Zone 22C is shown as a charging zone, which may represent a conference room, office, dining room, or a room in which receivers are often located. Signs may represent the anticipated frequency of receivers located within the room, and/or the expected pattern or set-up in which receivers may be positioned within the zone. For example, a sign may represent a conference room with information regarding where expected receivers will be situated, for example at specific places at a table.

Zones may be marked by a single sign indicating a center of a circular, elliptic or square zone, of specific size or angular size. It should be noted that signs may represent corners, such as sign 24C, but also other types of closed shapes. Another implementation disclosed may be of two or more signs used to delineate the perimeter or area of a charging zone. When discussing polygons in the context of this disclosure, any other closed shaped in 2- or 3-dimensions may be used, such as shapes with various types of rounded corners or other non-sharp corners and bends. Similarly, when the word corner is used, it may refer to a rounded corner or any other distinct bend in the periphery of the shape.

Reference is now made to FIGS. 3A-3J, showing exemplary geometric properties of signs.

Figure 3A:
FIGS. 3A to 3C show a number of examples of signs which are symmetric, and thus not useable for the novel systems of the present disclosure.

A sign shaped like a circle, as a simplified example, shown in FIG. 3A would provide the transmitter with one unit of size (its diameter) and one dimension of angular position in space, which is the direction perpendicular to its surface, shown as a black arrow.

Figure 3B:
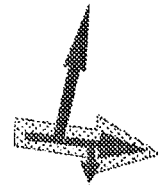

A sign shaped like an arrow, as another simplified example, shown in FIG. 3B, would provide the transmitter with units of size (length, width, size of the tip) and typically two or three directions, shown as black arrow heads in FIG. 3B.

Figure 3C:
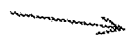

A simplified arrow, shown in FIG. 3C, consisting of lines but not surfaces, may be another useful implementation of such signs, although such a shape usually has low detection visibility, limiting its usefulness.

Such shapes allow the identification of the position of the target, relative to the sign. However, none of the above shapes shown in FIGS. 3A, 3B and 3C are asymmetric, since a circle is indistinguishable from its mirror image, and an arrow is indistinguishable from its rotated mirror image. Therefore, a transmitter would be unable to distinguish the mirror image of these signs received after the beam has undergone a reflection, from an image received directly from such a sign.

Figure 3D:
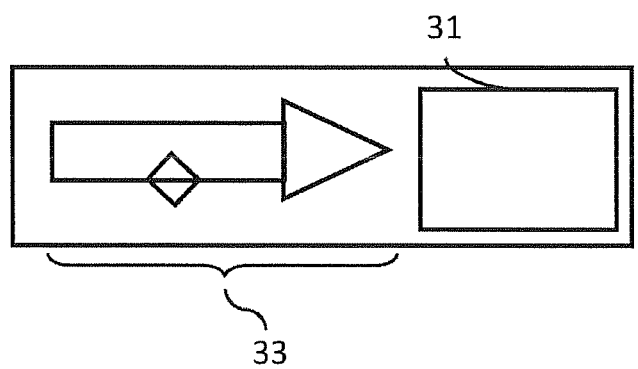
FIG. 3D shows an asymmetric sign, used, to determine whether an image received of the sign, is an image directly received, or a mirror image of the sign, received after a reflection.

Reference is now made to FIG. 3D, which illustrates an exemplary asymmetric sign 33 disposed on a receiver, and indicating by its position and direction, where the photocell 31 is situated on the receiver. The asymmetric sign 33 is distinguishable from its mirror image. Such a sign allows the system to determine whether the sign is being viewed directly, or after reflection in a mirror.

With regard to asymmetrical shapes, it should be noted that many two-dimensional shapes, including the shape shown in FIG. 3D, if rotated in up to three dimensions, may be identical to their mirror image, depending on the direction from which they are viewed. This would be so if the shape were viewed from the opposite side of the plane of the drawing of FIG. 3D, i.e. if viewed through the material which comprises the sign. However, since such shapes, in the practical implementations of this disclosure, where the signs are typically affixed to a surface such that there is no access to the back-side of the sign, and in which the signs are viewed using a camera or a sensing system having a fixed field of view, which images the sign from only one side of the plane in which the sign is situated, shapes such as FIG. 3D, can be considered to be fully asymmetric within the context of this disclosure. The type of asymmetric sign shown in FIG. 3D could be used by the system to determine whether an image received of it is an image directly received from the sign, or a mirror image of the sign.

Reference is now made to FIGS. 3E to 3J, which show various images of the letter F, as an example, to illustrate the concept of a mirror image of a sign, as used and as claimed in the present disclosure.

Figure 3E:
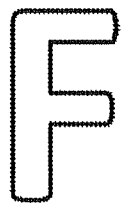
FIGS. 3E to 3J show various images of the letter F, as an example, to illustrate the concept of a mirror image of an object.

The original, non-reflected image of the sign is the shape of an upright capital letter "F", as shown in FIG. 3E. The comparison of a received image with a representation of the original sign, object or pattern being imaged, may need to be performed after first executing any or all of rotations, tilts and magnification operations on the image as required, before comparison with a direct image of the original sign pattern, or a cropped direct image of the original sign pattern. The rotations can be performed in one or more of the three co-ordinate axes of the three dimensional image.

An image of a sign detected may need a simple 90° rotation round the axis projecting out of the plane of the image to bring the image into the correct rotational orientation in a 2-dimensional field of view. In addition, only lateral magnification may be needed to attain the original upright letter "F", i.e. the original sign pattern.

Figure 3F:

In FIG. 3F, tilt, rotation, and magnification would be required to match the image to its original pattern. Thus, the image may need to be tilted until it appears on a plane parallel to the compared source image of the letter F, then rotated till it is upright, then increased in size until its dimensions match the pattern, during the comparison procedure with the original upright letter "F", i.e. the original sign pattern shown in FIG. 3E.

Figure 3G:
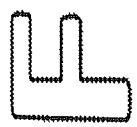

In FIG. 3G, rotation, tilt and also possibly magnification may be required to fit the original upright letter "F", i.e. the original sign pattern.

Figure 3H:

In FIG. 3H, besides the three operations previously described, cropping of the original pattern from the database may be required during the comparison procedure.

All of the above representations of the letter F may result in an exact match to the original pattern of the source upright letter "F".

Figure 3I:
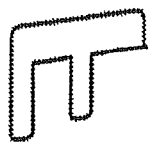
Figure 3J:

On the other hand, with regard to the images shown in FIGS. 3I and 3J, it is clear that no rotation, tilt or magnification performed on those images would give the original upright letter "F" as the images in FIGS. 3I and 3J are mirror images of the original letter F, and therefore the image would need to be reversed in order to attain the original upright letter "F".

A sign may consist of an asymmetric pattern that may be found in proximity to the target to be illuminated. The sign may also comprise a symmetric pattern that differs from its mirror image, such as a Frieze pattern or other repetitive patterns. The direction and distance from a point on the sign to the receiver, or more specifically, to the PV cell located within the receiver, should be known to the transmitter, either from an external source, or it may be encoded on the pattern itself, most conveniently by using a barcode.

The sign typically allows the transmitter to determine at least one, and preferably more than one, direction and size that allows the transmitter to estimate the location of the receiver. The sign typically allows the transmitter to determine at least one, and preferably more than one, direction and distance that allow the transmitter to determine the location of the receiver with which the sign is associated. For example, a sign may indicate that a target is 30 mm from it, and in a certain predefined direction. The system may also determine the expected size for a sign of this shape, for instance, 5×5 mm, in order to confirm identification and distance from the transmitter. This information may be found, for example, by looking it up in a database, or by encoding data from the sign itself. The sign may be viewed by the transmitter from different ranges, resulting in different sizes of the sign on the transmitter's imaging device. However, the exact position of the target may be calculated by determining the coordinate system of the sign i.e. its forward, left/right, and up/down directions, which may be performed by determining the amount of tilt requires to decode the image, and its size, which may be determined by the amount of zoom required to decode the image. Then, once the direction of the sign is known, and the extent and direction of the correct step to take to reach the target on the receiver is known, the position of the target may be easily calculated.

Figure 4:
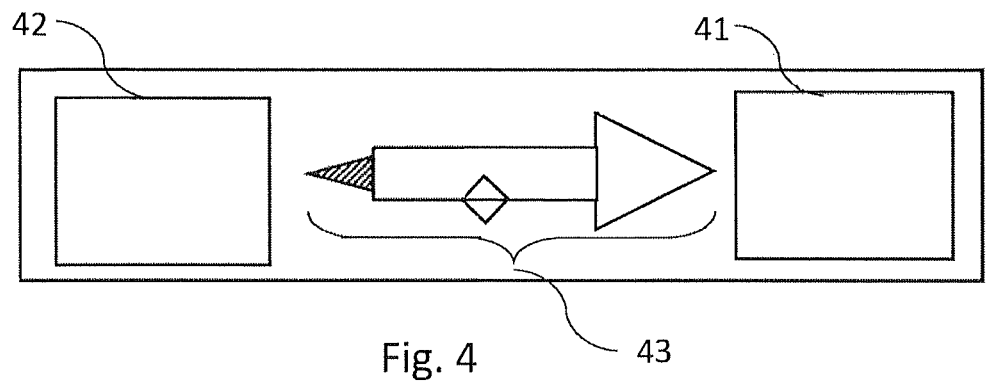
FIG. 4 illustrates a single sign showing the position of more than one receiver, or more than one target on a single receiver.

According to another implementation, as shown in FIG. 4, a single sign 43 may represent the position of more than one receiver 41 and 42, or more than one photocell on a single receiver. One transmitter may accordingly direct two beams towards the receivers, which are at known distances from the sign, or two transmitters may be used to emit two beams to the receivers associated with such a sign. It should be clear that a sign may represent multiple receivers and their locations, or signs may represent just a single receiver.

Signs may include other types of information such as:

The make and model of the receivers, power capabilities, power needs, identification, contact address and other types of information.

Figure 5:
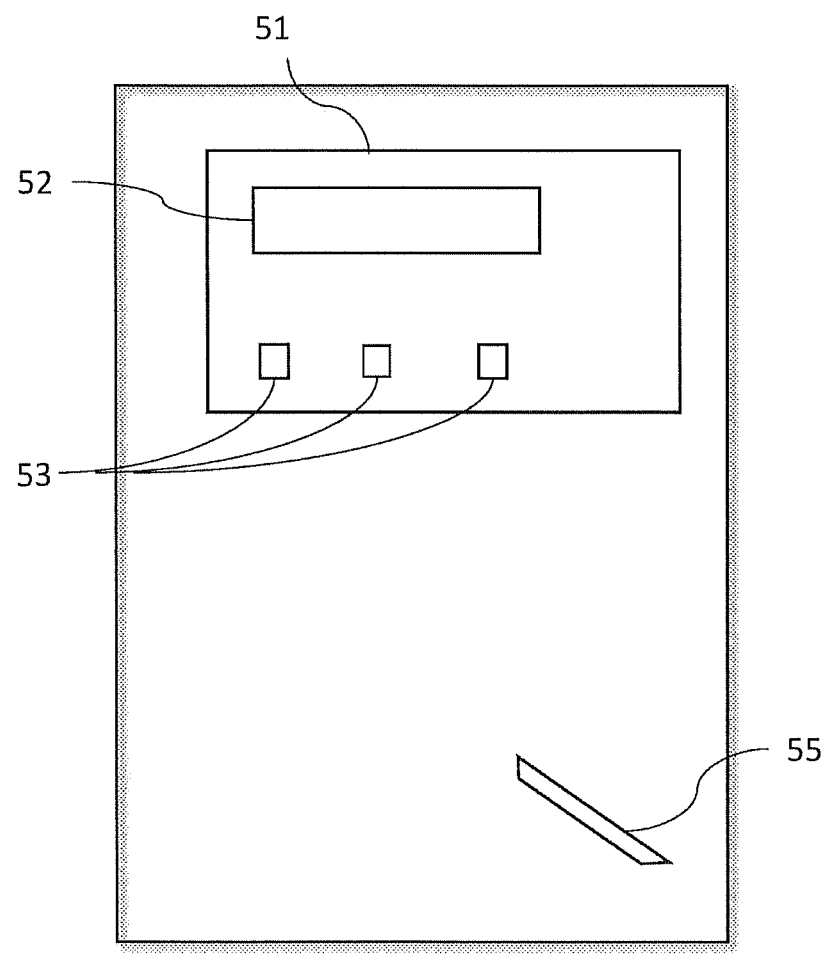
FIG. 5 shows a transmitter equipped with a number of sensors for detection and identification of signs such as those shown hereinabove.

Reference is now made to FIG. 5 which shows a transmitter 51 equipped with a number of sensors 53 for detection and identification of such signs 55. Each one of such sensors may identify at least a portion of the data encoded within the sign 55, and typically transfers it to a controller 52, or CPU which interprets the data and may act accordingly.

One sensor may be enough in most applications, however, having more than one sensor reduces the chances of false detection and generally improves detectability of the signs. Alternatively, each sensor may detect the same portion of a sign and compare results for redundancy.

Sensors are part of the wireless power supply system, and may be connected to the transmitter by being embedded within it, or with a wireless or a hard-wire connection, and/or both having a common controller or other device.

The receiver sign area must be at least $$\frac{10^{-8} \text{ meter}^2}{\text{number of } Tx \text{ sensors}}$$

and hence increasing the number of sensors allows a reduction in the required size of the sign associated with a receiver or increased detectability. Good detectability is typically achieved, if the area of the sign is increased, to be, for instance, greater than $$\frac{10^{-6} \text{ meter}^2}{\text{number of } Tx \text{ sensors}}$$

or even greater than $$\frac{10^{-4} \text{ meter}^2}{\text{number of } Tx \text{ sensors}}$$

in some extreme cases.

Use of the larger sized signs enables the scan time to be reduced significantly, and facilitates the application of the signs in applications where the user applies them, such as to mark the boundaries of a region to which power transmission is forbidden, such as for instance, a baby's crib. In mobile devices, such as cellular telephones, the design can be made such that the smaller sized signs can be used.

The transmitter typically collects information from the sign for a time period t, that is at least:

$$t > \frac{4*(\text{sensor rise time} + \text{sensor fall time})}{[\text{Number of sensors}]*\log_2\left(1 + \frac{\text{RMS signal}_{on\ sign}}{\text{RMS signal}_{not\ on\ sign}}\right)}$$

or in an equivalent expression using log10 values or, in its log10 form $$t > \frac{1.2*(\text{sensor rise time} + \text{sensor fall time})}{[\text{Number of sensors}]*\log_2\left(1 + \frac{\text{RMS signal}_{on\ sign}}{\text{RMS signal}_{not\ on\ sign}}\right)}$$

where the sensor rise time is the shortest time the output of any of the sensors change by at least 20%, and preferably 50-90%, between the output value generated when the system is not aimed on a sign, and the output value generated when the system is aimed at a sign.

The sensor fall time is the shortest time the output of any of the sensors change by at least 20%, and preferably 50-90%, between the output value generated when the system is aimed on a sign, and the output value generated when the system is not aimed at a sign.

The value [RMS signal$_{on\ sign}$] is the maximal RMS of the signal, generated by any sensor, when the system is aimed at a sign, or at a portion of it.

The value [RMS signal$_{not\ on\ sign}$] is the minimal RMS of the signal, generated by any sensor, when the system is not aimed on a sign (typically averaged over an environment).

After the signal is integrated and collected over that time t or more, the transmitter is configured to decide if a sign is an instruction or an information sign and to interpret its content, or if it is an invalid sign.

Figure 6:
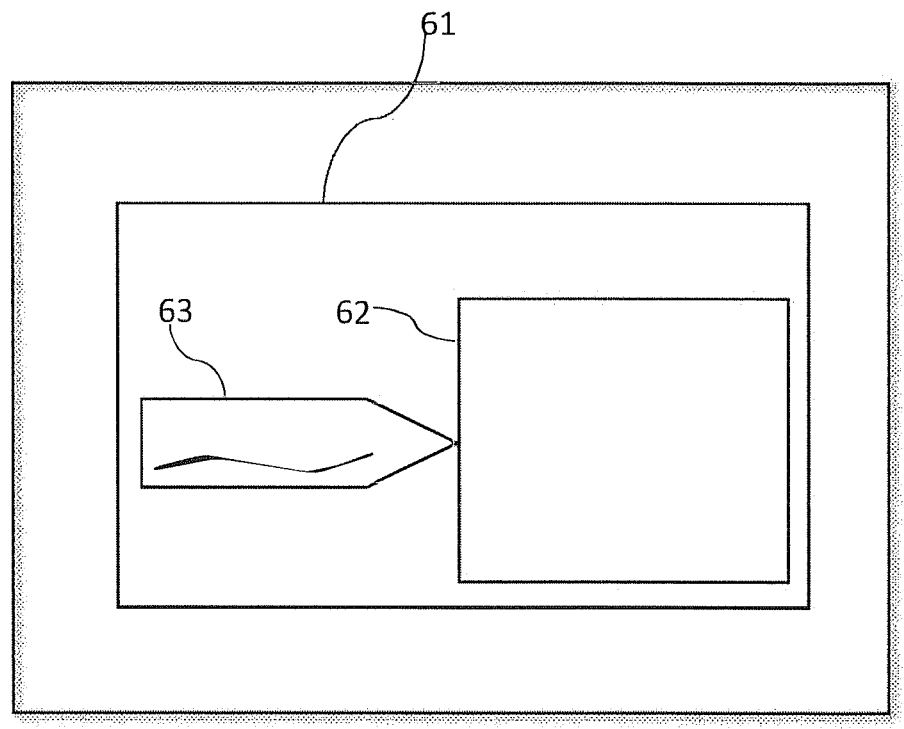
FIG. 6 shows a sign which is an integral part of a receiver, is asymmetric, embedded into the receiver and is at a fixed position relative to the photovoltaic cell.

Reference is now made to FIG. 6 which shows a sign 63, the sign being asymmetric and embedded into the receiver 61. The sign is at a fixed position relative to the photovoltaic cell, which may be the target for the beam emitted by the transmitter. Such a sign allows for positive identification of the receiver as a valid receiver.

Figure 7:
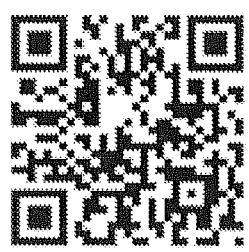
FIG. 7 shows a bar code, which is one example of a high contrast sign which may encode information.

Reference is now made to FIG. 7, which shows a bar code, which is one example of a high contrast sign which may encode information. According to one typical convention used in this disclosure, the term high contrast is understood to mean that the RMS signal when the sensor views a portion of the sign, is at least 1.3X greater than the RMS signal when the sensor views "no sign".

The term [RMS signal$_{on\ the\ sign}$] is the maximal RMS of the signal, generated by any sensor, when the system is aimed at a sign or a portion of it.

The term [RMS signal$_{not\ on\ the\ sign}$] is the minimal RMS of the signal, sign, generated by any sensor, when the system is aimed not on a sign (typically averaged over an environment)

Figure 8:
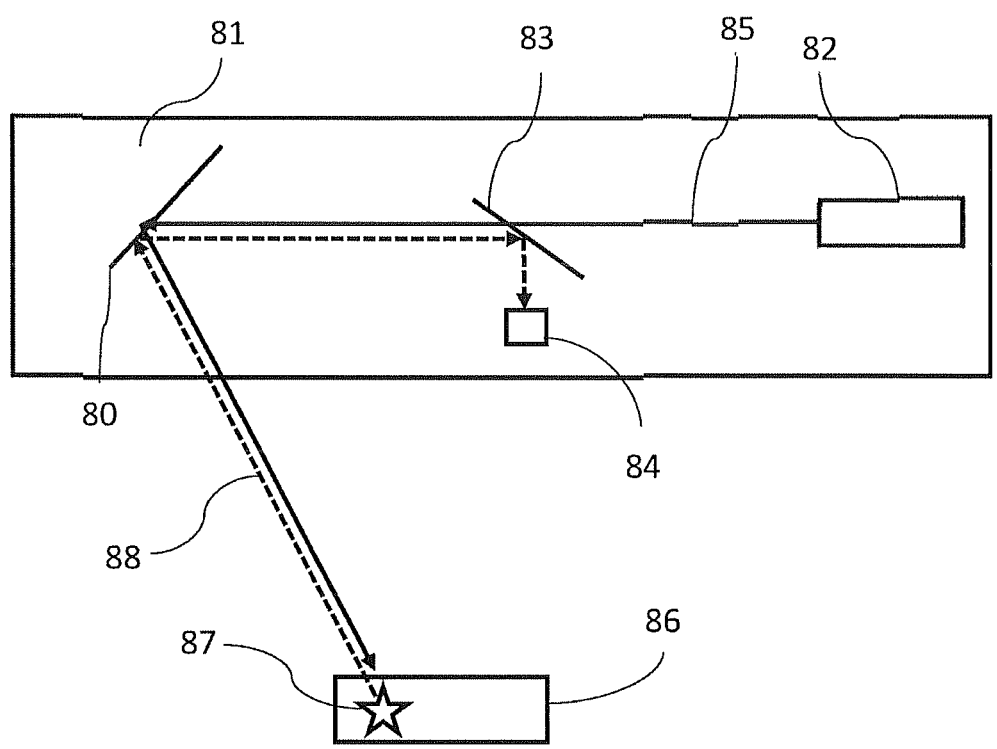
FIG. 8 illustrates a typical structure of the systems described in this disclosure.

Reference is now made to FIG. 8 which shows a typical exemplary structure of the systems of the type described in this disclosure. A beam emitter 82 emits a beam 85 that is directed towards a receiver 86 using a beam steering device 80. A sign 87 is located either on/in the receiver, or associated with the position of the receiver. The source of the sign, or the sign itself may consist of an RF emitter, a light emitter, a light reflector, a light retro reflector, or an ultrasound emitter.

In the case where the transmitter scans the room with a beam 85 to identify receivers, a signal emitted 88 from the sign 87, or an image of the sign caused by the incident beam reflecting off the sign, travels in the reverse direction 88 as the search beam, from the receiver 86 to the transmitter 81, where it is typically separated from the transmitted beam using a beam splitter 83, and is then directed towards a detector or detectors 84. The signal is designed to enable identification of the position of the receiver, and to confirm that the receiver is a valid receiver. The transmitter should first identify the signal emitted by the sign positively, before emitting a beam to begin wireless power supply. After positive identification of a sign, the risk of lasing towards a sensitive object is significantly reduced. In some instances, the transmitter may then direct a beam towards an identified receiver and thus safe wireless power transmission is ensured.

It is appreciated by persons skilled in the art that the present invention is not limited by what has been particularly shown and described hereinabove. Rather the scope of the present invention includes both combinations and sub-combinations of various features described hereinabove as well as variations and modifications thereto which would occur to a person of skill in the art upon reading the above description and which are not in the prior art.

We claim:

1. A method determining whether a zone is authorized to receive power from a wireless power-supplying device said method comprising:
   (a) scanning a field of view by said power-supplying device for detection of at least one sign associated with at least one zone,
   (b) from a database containing one or more representations of signs associated with different zones, performing a sign-matching algorithm which compares said at least one detected sign with at least one representation of a sign contained in said database,
   (c) if it is determined by said sign-matching algorithm that said detected sign matches at least one representation of a sign contained in said database, then determining from a predetermined protocol regarding the sign in said database, whether the zone is authorized to receive wireless power from said wireless power-supplying device, and if not authorized, preventing a receiver which has entered that zone from receiving wireless power.

2. The method according to claim 1 wherein said zones are any of: charging zones, non-charging zones, high-frequency receiver zones or reduced power receiving zones.

3. The method according to claim 1 further comprising instructing said wireless power supply system to operate in accordance with the predetermined protocol associated with said zone, wherein said instruction comprises either:
   (i) scanning a field of view associated with said detected sign or,
   (ii) preventing said wireless power-supplying device from either scanning or directing its beam towards a field of view associated with said detected sign.

4. The method according to claim 1, wherein at least one of said signs demarcates at least one feature of a zone.

5. The method according to claim 4 wherein said demarcation provides information regarding at least one of the: area, extent, boundary, corners, radius and center of a zone.

6. The method according to claim 1 wherein said at least one sign has at least one asymmetric property, such that said sign-matching algorithm can distinguish between a mirror image of a sign and its original image.

7. A system for determining whether a zone is authorized to receive power from a wireless power supply, said system comprising:
(a) a transmitter adapted to emit wireless power;
(b) a detector configured to detect at least one sign associated with at least one zone; and
(c) at least one controller adapted to:
  (i) receive signals from said detector;
  (ii) access a database containing one or more representations of signs associated with different zones,
  (iii) execute a sign-matching algorithm to determine whether said detected sign matches at least one representation of a sign contained in said database, and
  (iv) determine whether said zone is authorized to receive wireless power from_said wireless power supply system, and if not authorized, preventing a receiver in said zone from receiving power.

8. The system according to claim 7 further comprising instructing said wireless power supply to operate according to a pre-determined protocol associate with said detected sign, wherein said pre-determined protocol comprises at least one of scanning a field of view associated with said detected sign and directing at least one beam from said transmitter towards at least one receiver associated with said detected sign.

9. The system according to claim 8 wherein said pre-determined protocol comprises preventing said wireless power-supplying device from either scanning or directing its beam towards a field of view associated with said detected sign.

10. The system according to claim 7 wherein said zones are any of: charging zones, non-charging zones, high-frequency receiver zones or reduced power receiving zones.

11. The system according to claim 7, wherein at least one of said signs demarcates at least one feature of a zone.

12. The system according to claim 11 wherein said demarcation provides information regarding at least one of the: area, extent, boundary, corners, radius and center of a zone.

13. The system according to claim 7 wherein said at least one sign has at least one asymmetric property, such that said sign-matching algorithm can distinguish between a mirror image of a sign and its original image.

* * * * *